United States Patent
Hong et al.

(10) Patent No.: US 9,141,206 B2
(45) Date of Patent: Sep. 22, 2015

(54) APPARATUS AND METHOD FOR MOTION DETECTION IN PORTABLE TERMINAL

(75) Inventors: Hyun-Su Hong, Seongnam-si (KR); Gye-Joong Shin, Seongnam-si (KR); Woo-Jin Jung, Yongin-si (KR); Jae-Myeon Lee, Yongin-si (KR)

(73) Assignee: Samsung Electronics, Co., Ltd., Suwon-Si (KR)

( * ) Notice: Subject to any disclaimer, the term of this patent is extended or adjusted under 35 U.S.C. 154(b) by 1024 days.

(21) Appl. No.: 12/802,606

(22) Filed: Jun. 10, 2010

(65) Prior Publication Data
US 2010/0315253 A1    Dec. 16, 2010

(30) Foreign Application Priority Data

Jun. 12, 2009   (KR) .................. 10-2009-0052132

(51) Int. Cl.
G08B 21/00 (2006.01)
G06F 3/038 (2013.01)

(52) U.S. Cl.
CPC ...................... *G06F 3/038* (2013.01)

(58) Field of Classification Search
USPC ............... 340/500, 540, 670, 686.1, 687; 702/141, 150; 345/156, 158
See application file for complete search history.

(56) References Cited

U.S. PATENT DOCUMENTS

| | | | | |
|---|---|---|---|---|
| 5,616,078 A * | 4/1997 | Oh | ..................... | 463/8 |
| 5,627,565 A * | 5/1997 | Morishita et al. | ............. | 345/158 |
| 6,201,554 B1 * | 3/2001 | Lands | ........................... | 345/169 |
| 6,369,794 B1 * | 4/2002 | Sakurai et al. | ................ | 345/156 |
| 6,375,572 B1 * | 4/2002 | Masuyama et al. | ............. | 463/43 |
| 7,158,118 B2 * | 1/2007 | Liberty | ......................... | 345/158 |
| 7,173,604 B2 * | 2/2007 | Marvit et al. | .................. | 345/156 |
| 7,424,385 B2 * | 9/2008 | Cho et al. | ...................... | 702/141 |
| 7,430,439 B2 * | 9/2008 | Griffin et al. | .............. | 455/552.1 |
| 7,519,537 B2 * | 4/2009 | Rosenberg | ..................... | 704/275 |
| 7,688,306 B2 * | 3/2010 | Wehrenberg et al. | .......... | 345/158 |
| 7,702,282 B2 * | 4/2010 | Sandegard et al. | .......... | 455/41.2 |
| 7,716,008 B2 * | 5/2010 | Ohta | ............................. | 702/152 |
| 7,735,025 B2 * | 6/2010 | Lee et al. | ...................... | 715/863 |
| 7,852,315 B2 * | 12/2010 | Ofek et al. | .................... | 345/157 |

(Continued)

FOREIGN PATENT DOCUMENTS

| | | |
|---|---|---|
| CA | 2820737 | 9/2006 |
| CN | 1863225 | 11/2006 |
| CN | 1969250 | 5/2007 |

OTHER PUBLICATIONS

Chinese Office Action dated Jan. 30, 2014 in connection with Chinese Patent Application No. 2010101976304, 13 pages.

(Continued)

*Primary Examiner* — George A Bugg
*Assistant Examiner* — Paul Obiniyi

(57) ABSTRACT

A portable terminal includes an apparatus for improving motion detection capability. More particularly, the apparatus improves motion detection capability by changing a motion in a normal state according to a motion state or by changing a motion detection process in the portable terminal in order to avoid motion detection capability deterioration in the portable terminal are provided. The apparatus includes a terminal state determiner that determines a motion state of the terminal by receiving sensing information for determining the motion state, and a controller that changes a motion detection process according to the portable terminal's motion state determined by the terminal state determiner.

14 Claims, 4 Drawing Sheets

(56) References Cited

U.S. PATENT DOCUMENTS

| | | | |
|---|---|---|---|
| 7,854,656 B2 * | 12/2010 | Sato et al. | 463/36 |
| 7,890,289 B2 * | 2/2011 | Kim et al. | 702/151 |
| 7,911,457 B2 * | 3/2011 | Vardi | 345/179 |
| 7,980,952 B2 * | 7/2011 | Ohta | 463/36 |
| 8,428,669 B2 * | 4/2013 | Yamamoto | 455/575.4 |
| 8,924,248 B2 * | 12/2014 | Tropper et al. | 705/14.22 |
| 8,952,832 B2 * | 2/2015 | Nasiri et al. | 341/20 |
| 8,960,002 B2 * | 2/2015 | Nasiri et al. | 73/514.02 |
| 8,997,564 B2 * | 4/2015 | Nasiri et al. | 73/493 |
| 2004/0012566 A1 * | 1/2004 | Bradski | 345/158 |
| 2004/0029640 A1 * | 2/2004 | Masuyama et al. | 463/43 |
| 2005/0052414 A1 * | 3/2005 | Park et al. | 345/158 |
| 2005/0065728 A1 * | 3/2005 | Yang et al. | 701/220 |
| 2005/0174324 A1 * | 8/2005 | Liberty et al. | 345/156 |
| 2005/0212760 A1 * | 9/2005 | Marvit et al. | 345/156 |
| 2005/0212767 A1 * | 9/2005 | Marvit et al. | 345/158 |
| 2005/0222802 A1 * | 10/2005 | Tamura et al. | 702/150 |
| 2005/0243061 A1 * | 11/2005 | Liberty et al. | 345/158 |
| 2005/0253806 A1 * | 11/2005 | Liberty et al. | 345/156 |
| 2006/0022833 A1 * | 2/2006 | Ferguson et al. | 340/573.1 |
| 2006/0028446 A1 * | 2/2006 | Liberty et al. | 345/158 |
| 2006/0100820 A1 * | 5/2006 | Davidson | 702/151 |
| 2006/0125782 A1 * | 6/2006 | Orchard et al. | 345/156 |
| 2006/0174685 A1 * | 8/2006 | Skvortsov et al. | 73/1.37 |
| 2006/0255139 A1 * | 11/2006 | Lee et al. | 235/439 |
| 2006/0258194 A1 * | 11/2006 | Cho et al. | 439/108 |
| 2007/0225935 A1 * | 9/2007 | Ronkainen et al. | 702/150 |
| 2007/0259685 A1 * | 11/2007 | Engblom et al. | 455/550.1 |
| 2008/0140338 A1 * | 6/2008 | No et al. | 702/141 |
| 2008/0174550 A1 * | 7/2008 | Laurila et al. | 345/158 |
| 2008/0214160 A1 * | 9/2008 | Jonsson | 455/414.2 |
| 2008/0248872 A1 * | 10/2008 | Endo | 463/36 |

OTHER PUBLICATIONS

Extended European Search Report dated May 21, 2014 in connection with European Patent Application No. 10165601.5, 13 pages.

Third Office Action dated Apr. 1, 2015 in connection with Chinese Patent Application No. 2010101976304; 7 pages.

Notice of Preliminary Rejection dated Jun. 22, 2015 in connection with Korean Patent Application No. 10-2009-0052132; 10 pages.

* cited by examiner

APPARATUS AND METHOD FOR MOTION DETECTION IN PORTABLE TERMINAL

CROSS-REFERENCE TO RELATED APPLICATION(S) AND CLAIM OF PRIORITY

This application claims the benefit under 35 U.S.C. §119(a) of a Korean patent application filed in the Korean Intellectual Property Office on Jun. 12, 2009 and assigned Serial No. 10-2009-0052132, the entire disclosure of which is hereby incorporated by reference.

TECHNICAL FIELD OF THE INVENTION

The present invention relates to an apparatus and method for improving motion detection capability in a portable terminal that provides a motion detection function. More particularly, the present invention relates to an apparatus and method for improving motion detection capability by changing a motion in a normal state according to a motion state or by changing a motion detection process in the portable terminal in order to avoid motion detection capability deterioration in the portable terminal.

BACKGROUND OF THE INVENTION

Portable terminals have become necessities of modern life for people of all ages. Thus, service providers and terminal manufacturers are competitively developing differentiated products (or services).

For example, the portable terminal has developed into a multimedia device capable of providing various services such as phonebooks, games, short messages, e-mails, wake-up calls, MPEG-1 Audio Layer 3 (MP3) players, digital cameras, and wireless Internet services.

In addition to the aforementioned functions, recently launched portable terminals provide an additional function using an operation detector.

Examples of the additional function using the operation detector include a beat-box, a dice, a passometer, a telephone dial, and the like. The additional function provides a user with great pleasure by using a motion detection function which operates by detecting a user's motion.

Taking a dice function for example among the examples of the additional function using the operation function, when the user of the portable terminal shakes the terminal in a certain direction, a dice displayed on a screen of the portable terminal rotates and thus the user can have the same effect and fun as if the user directly rolls the dice.

The additional function using the operation detector uses an acceleration sensor or a gyroscope sensor to detect a user's gesture, but cannot correctly detect the user's gesture when the user of the portable terminal is in motion or moves.

Therefore, when the user makes a gesture while moving, the portable terminal cannot correctly detect the user's gesture and thus the motion detection function deteriorates in performance.

In addition, when the same motion as a gesture for motion detection occurs while the user of the portable terminal moves, the portable terminal recognizes the motion as the gesture for motion detection even if the user does not intend to perform the motion detection function, and as a result, an unnecessary operation may be performed.

Accordingly, there is a need for an apparatus and method for a portable terminal capable of correctly recognizing gestures even in a state where a user moves.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide an apparatus and method for improving motion detection capability of a portable terminal.

Another aspect of the present invention is to provide an apparatus and method for changing a motion detection process according to a motion state in a portable terminal.

Yet another aspect of the present invention is to provide an apparatus and method for changing a motion in a normal state according to a motion state in a portable terminal.

In accordance with an aspect of the present invention, an apparatus for motion detection of a portable terminal is provided. The apparatus includes a terminal state determiner that determines a motion state of the terminal by receiving sensing information for determining the motion state, and a controller for changing a motion detection process according to the portable terminal's motion state determined by the terminal state determiner.

In accordance with another aspect of the present invention, a method for motion detection of a portable terminal is provided. The method includes determining a motion state of the terminal by receiving sensing information for determining the motion state, and changing a motion detection process according to the determined motion state of the terminal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure.

An apparatus and method for changing a motion detection process in accordance with a motion state in a portable terminal in order to improve motion detection capability of the portable terminal will be described hereinafter according to exemplary embodiments of the present invention.

The changing of the motion detection process includes changing a parameter required for motion detection, changing a motion detection model, changing sensing information for function control according to the motion state, changing a parameter indicating a criterion for determining a user's motion, deactivating a motion detection function according to the motion state of the user, and so forth.

Figure 1:
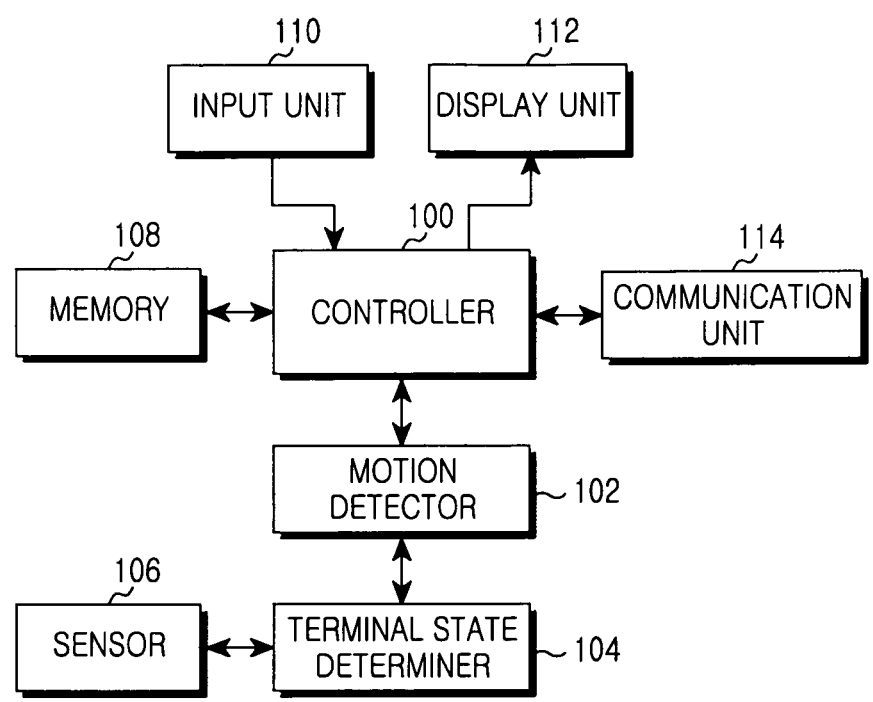
FIG. 1 illustrates a block diagram of a portable terminal for improving motion detection capability according to an exemplary embodiment of the present invention.

FIG. 1 illustrates a block diagram of a portable terminal for improving motion detection capability according to an exemplary embodiment of the present invention.

FIG. 1, the portable terminal may include a controller 100, a motion detector 102, a terminal state determiner 104, a sensor 106, a memory 108, an input unit 110, a display unit 112, and a communication unit 114.

The controller 100 provides overall control to the portable terminal. For example, the controller 100 performs processing and control for voice telephony and data communication. In addition to its typical function, according to the present invention, the controller 100 determines a motion state of the portable terminal by using sensing information received from the sensor 106. Thereafter, the controller 100 changes a motion detection process according to the determined motion state of the portable terminal.

The changing of the motion detection process includes changing a parameter for motion detection to increase a motion detection success rate for functional control, changing a motion detection model, changing a parameter indicating a criterion for determining a user's motion according to the motion state, and changing motion detection information in a normal state according to the motion state, and so forth. The controller 100 controls the terminal state determiner 104 to determine the motion state of the portable terminal. For example, in a state where the user of the portable terminal walks fast, the controller 100 provides control such that a signal X received to determine motion detection is changed to a signal X1 corresponding to a fast pace, and thus even if the user makes a gesture for motion detection while moving at a fast pace in practice, the portable terminal recognizes the gesture as if it is made in the normal state.

The motion detector 102 determines a motion made by the user of the portable terminal by using sensing information received from the sensor 106 for function control, and thereafter provides information on the determined motion to the controller 100.

The terminal state determiner 104 receives sensing information required to determine the motion state of the portable terminal from the sensor 106 and determines the motion state of the portable terminal. That is, by using the sensing information, the terminal state determiner 104 determines whether the user of the portable terminal walks, walks at a fast pace, runs, or runs at a very fast pace.

The sensor 106 includes a plurality of sensors (such as a gyro sensor and an acceleration sensor), and gathers the sensing information required to determine the motion state of the portable terminal and the sensing information for function control. Thereafter, the sensor 106 provides the terminal state determiner 104 with the sensing information required to determine the motion state of the portable terminal and the sensing information for function control or directly provides the motion detector 102 with the sensing information for function control to allow the motion detector 102 to perform the motion detection process.

The memory 108 preferably includes, for example, a Read Only Memory (ROM), a Random Access Memory (RAM), a flash ROM, and the like. The ROM stores a variety of reference data and a microcode (i.e., code) of a program for processing and control of the controller 100, the motion detector 102, and the terminal state determiner 104.

The RAM is a working memory of the controller 100 and stores temporary data that is generated while various programs are performed. The flash ROM stores a variety of rewritable data, such as phonebook entries, outgoing messages, and incoming messages, information of a touch input point of the user, and the like.

The input unit 110 includes a plurality of function keys such as numeral key buttons of '0' to '9', a menu button, a cancel button, an OK button, a talk button, an end button, an Internet access button, a navigation (or direction) key button, a character input key, and the like. Key input data (such as a motion detection function operation), which is input when the user presses these keys, is provided to the controller 100.

The display unit 112 displays information such as state information, which is generated while the portable terminal operates, limited numeric characters, large volumes of moving pictures, still pictures, and the like. The display unit 112 may be a color Liquid Crystal Display (LCD), Active Mode Organic Light Emitting Diode (AMOLED), and the like. The display unit 112 may include a touch input device as an input device when using a touch input type portable terminal.

The communication unit 114 transmits and receives a Radio Frequency (RF) signal of data that is input and output through an antenna (not shown). For example, in a transmitting process, data to be transmitted is subject to a channel-coding process and a spreading process, and then the data is transformed to an RF signal. In a receiving process, the RF signal is received and transformed to a base-band signal, and the base-band signal is subject to a de-spreading process and a channel-decoding process, thereby restoring the data.

Although the functions of the motion detector 102 and the terminal state determiner 104 can be performed by the controller 100 of the portable terminal, these elements are separately constructed in the present invention for exemplary purposes only. Thus, those ordinary skilled in the art can understand that various modifications can be made within the scope of the present invention. For example, these elements may be constructed such that their functions are processed by the controller 100.

FIG. 2 illustrates a motion detection operation process in accordance with a motion state of a portable terminal according to exemplary embodiments of the present invention.

Figure 2A:
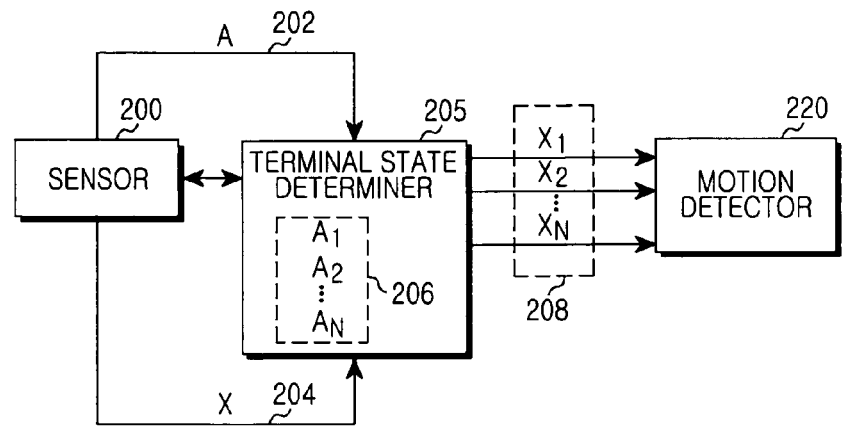
FIG. 2A illustrates a process of changing sensing information for function control in accordance with a motion state in a portable terminal according to an exemplary embodiment of the present invention.

FIG. 2A illustrates a process of changing sensing information for function control in accordance with a motion state in a portable terminal according to an exemplary embodiment of the present invention.

FIG. 2A, the portable terminal allows a sensor 200 to gather sensing information A 202 required to determine the motion state of the portable terminal and sensing information X 204 for function control.

After gathering the sensing information 202 and 204, the sensor 200 provides the received sensing information 202 and 204 to a terminal state determiner 205.

The terminal state determiner 205 determines a motion state 206 of the portable terminal (as indicated by $A_1$, $A_2$, ..., $A_N$ in FIG. 2A) by using the sensing information 202 required to determine the motion state of the portable terminal. The motion state of the portable terminal may be a non-moving state, a walking state, a fast-waking state, a running state, a fast-running state, and the like.

The terminal state determiner 205 changes the sensing information 204 received from the sensor 200 for function control into a signal $X_1, X_2, \ldots, X_N$ corresponding to the determined motion state (as indicated by 208 in FIG. 2A), and provides the resultant signal to a motion detector 220.

For example, if the signal X is received in a state where the state $A_1$ is determined by the terminal state determiner 205, the received signal X is converted into the signal $X_1$.

As a result, the motion detector 220 can solve the conventional problem in which motion detection cannot be correctly performed using a sensing signal that is added according to the motion state of the portable terminal.

Figure 2B:
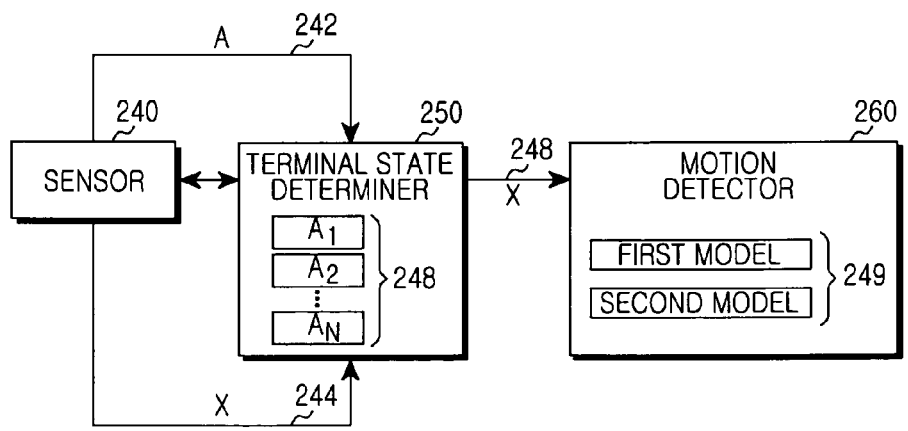
FIG. 2B illustrates a process of changing a motion detection model in accordance with a motion state in a portable terminal according to an exemplary embodiment of the present invention.

FIG. 2B illustrates a process of changing a motion detection model in accordance with a motion state in a portable terminal according to an exemplary embodiment of the present invention.

FIG. 2B, the portable terminal allows a sensor 240 to gather sensing information A 242 required to determine the motion state of the portable terminal and sensing information X 244 for function control After gathering the sensing information 202 and 244, the sensor 240 provides the received sensing information 242 and 244 to a terminal state determiner 250.

As described above, the terminal state determiner 250 determines a motion state 248 of the portable terminal (as indicated by $A_1, A_2, \ldots, A_N$ in FIG. 2B) by using the sensing information 242 required to determine the motion state of the portable terminal.

Further, the terminal state determiner 250 directly provides a motion detector 260 with the sensing information X 244 received from the sensor 240 for function control.

The motion detector 260 performs motion detection (as indicated by 260) by changing a model 249 required for motion detection according to the portable terminal's motion state determined by the terminal state determiner 250.

For example, if the terminal state determiner 250 determines that the motion state of the portable terminal is a running state, the motion detector 260 changes the current model to a motion detection model capable of performing correct motion detection by using additional sensing information generated in the running state.

In addition thereto, the portable terminal of the present invention can improve motion detection capability by changing a parameter according to the motion station. Herein, the parameter is used as a criterion for determining sensing information for function control and is generated in accordance with a motion of the user. For example, under the assumption that the portable terminal determines the sensing information for function control by using a parameter S, if the user of the portable terminal is in motion in a normal state, the parameter S used as a criterion for motion detection can be used for correct motion detection, that is, sensing information can be determined as sensing information for function control. However, when the user of the portable terminal generates sensing information in a state where the user runs fast, the portable terminal cannot determine whether the sensing information is the sensing information for function control by using the parameter S.

Accordingly, in order to determine whether the sensing information generated in a fast-running state is the sending information for function control, the portable terminal may determine whether the sensing information is the sensing information for function control by changing the parameter S used as the criterion for motion detection into a parameter S1.

An apparatus for changing a motion detection process in accordance with a motion state of a portable terminal to improve motion detection capability of the portable terminal has been described above according to exemplary embodiments of the present invention. Hereinafter, a method of improving motion detection capability of a portable terminal by changing a motion in a normal state in accordance with a motion state by using the apparatus above will be described according to exemplary embodiments of the present invention.

Figure 3:
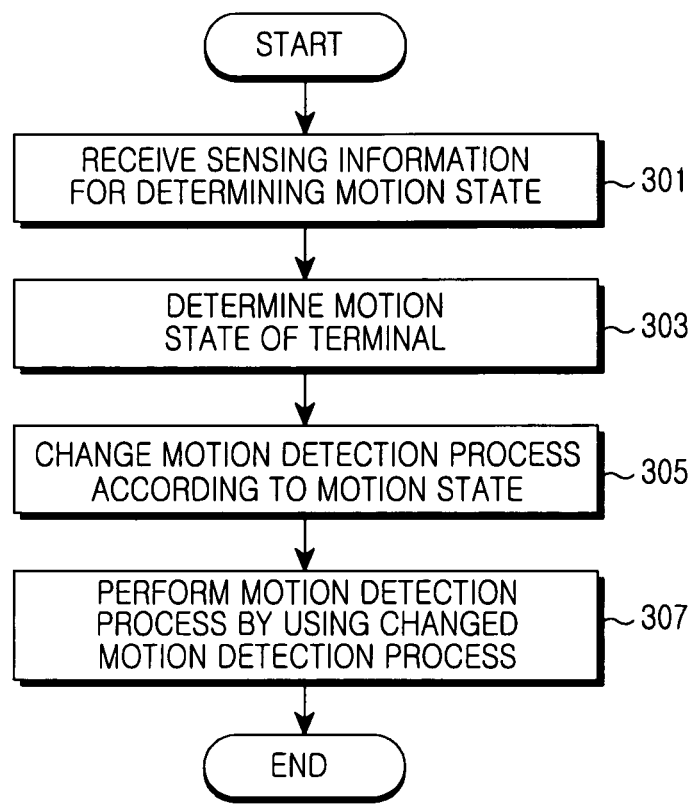
FIG. 3 illustrates a flowchart of a process of improving capability of a motion detection function in a portable terminal according to an exemplary embodiment of the present invention.

FIG. 3 illustrates a flowchart of a process of improving capability of a motion detection function in a portable terminal according to an exemplary embodiment of the present invention.

FIG. 3, the portable terminal receives sensing information for determining a motion state in step 301, and then determines the motion state of a user of the portable terminal in step 303. In this case, the portable terminal receives the sensing information (such as acceleration information, slope information, and the like) for determining the motion state of the user so as to determine whether the user is walking, walking at a fast pace, running, or running at a very fast pace.

In step 305, the portable terminal changes a motion detection process according to the motion state.

The changing of the motion detection process includes changing a parameter for motion detection to increase a motion detection success rate for functional control, changing a motion detection model, changing motion detection information in a normal state according to the motion state, and changing a parameter indicating a criterion for determining a user's motion according to the motion state.

That is, if it is assumed that the user is in motion to play back music in a fast-running state, the motion cannot be correctly detected in the fast-running state. Therefore, the portable terminal improves capability of the motion detection operation by adding a weight to the slope information and acceleration information required for motion detection in order to increase the capability of the motion detection operation.

In addition, the portable terminal changes music played back in the normal state to fit a running state by training the motion for music playback in the running state.

In step 307, the portable terminal performs the motion detection process by using the motion detection process changed in step 305.

That is, the portable terminal can improve motion detection capability by changing a parameter required for motion detection according to the motion state, by changing the motion detection model according to the motion state, or by changing information for motion detection in the normal state according to the motion state.

Thereafter, the procedure of FIG. 3 ends.

Although it has been described in FIG. 3 that the motion detection process changes for motion detection in accordance with the state of the portable terminal to improve motion detection capability according to the exemplary embodiment of the present invention, the present invention can also deactivate an operation of the motion detection function to avoid unnecessary erroneous operations when the portable terminal is in a state where the motion detection capability deteriorates.

Figure 4:
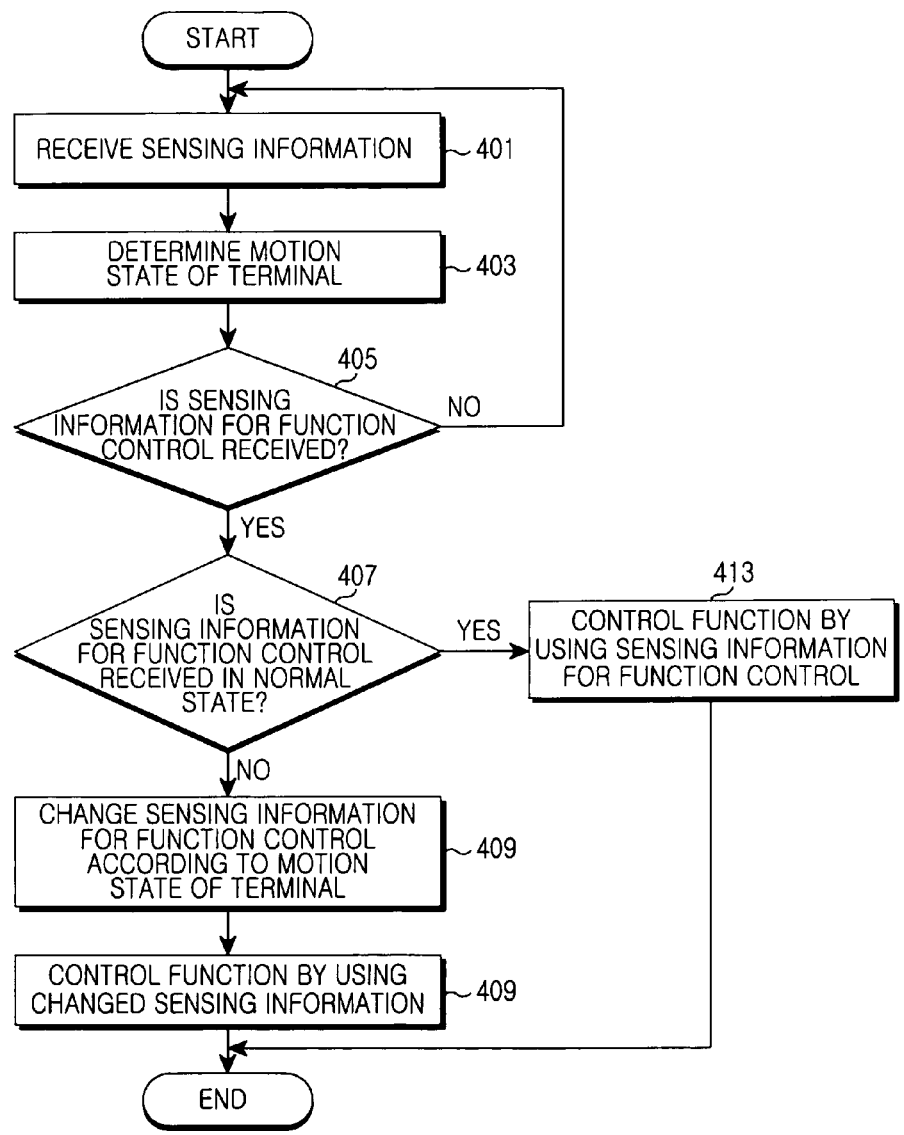
FIG. 4 illustrates a flowchart of a process of improving capability of a motion detection function in a portable terminal according to an exemplary embodiment of the present invention.

FIG. 4 illustrates a flowchart of a process of improving capability of a motion detection function in a portable terminal according to an exemplary embodiment of the present invention.

FIG. 4, the portable terminal changes sensing information received to improve motion detection capability in accordance with a motion state according to the exemplary embodiment of the present invention, and detects a motion by using the changed information.

The portable terminal receives sensing information for determining the motion state in step 401, and then determines the motion state of the terminal in step 403. That is, the portable terminal performs a process of determining whether a user of the portable terminal moves at a normal pace, walks fast, runs, and the like.

In step 405, the portable terminal determines whether sensing information for function control is received. The sensing information for function control is motion information for controlling the portable terminal by using the motion detection function, and is pre-defined in the portable terminal to control an operation of the portable terminal.

If the sensing information for function control is not received in step 405, returning to step 401, the portable terminal determines the state of the portable terminal.

Otherwise, if the sensing information for function control is received in step 405, proceeding to step 407, the portable terminal determines whether the sensing information for function control is received in a normal state. That is, the motion state of the portable terminal at a time when the sensing information for function control is received is determined in step 407, and if the motion state is not in the normal state, in which motion detection can be performed normally, but in a running state or a walking state, the portable terminal changes the received sensing information for function control according to the motion state to improve motion detection capability, and detects the motion by using the changed sensing information.

If the sensing information for function control is received in the normal state (e.g., in a state when the user does not move) in step 407, proceeding to step 413, the portable terminal control a corresponding function by detecting the received sensing information for function control.

Otherwise, if the sensing information for function control is received not in the normal state but in other states (e.g., in a state where the user runs) in step 407, proceeding to step 409, the portable terminal changes the sensing information for function control to information corresponding to the motion state of the portable terminal.

In this case, a motion to be changed for each state by using a motion for function control in the normal state of the portable terminal is pre-learned and stored in the portable terminal.

In addition, the portable terminal may deactivate the motion detection function to prevent the motion detection function from being unnecessarily performed when using sensing information in a running state as the sensing information for function control.

In step 411, the portable terminal controls a function corresponding to the sensing information for function control by using the changed sensing information.

Thereafter, the procedure of FIG. 4 ends.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A portable terminal providing motion detection, the portable terminal comprising:
   a memory configured to store a plurality of motion detection models comprising a standing still mode, a walking mode and a running mode, each motion detection model comprising respective different parameters to identify a motion of the terminal;
   a sensor configured to generate sensing information comprising first information for identifying a motion state and second information for identifying the motion of the terminal; and
   a controller configured to:
      select a motion detection model among the stored plurality of motion detection models, based on the first information;
      compensate the second information using a parameter of the selected motion detection model; and
      identify the motion of the terminal based on the compensated second information,
   wherein the controller is further configured to perform the motion detection by using the selected motion detection model, wherein the first information used to determine the motion detection model is received from a sensor comprising one or more of a gyro sensor and an acceleration sensor,
   wherein the controller is configured to deactivate a motion detection function if an error occurs in the motion detection when the motion state of the portable terminal is identified by the controller, and
   wherein the controller is configured to control an operation of the portable terminal corresponding to the identified motion.

2. The portable terminal of claim 1, wherein the controller is configured to deactivate the motion detection function if an error occurs in the motion detection based on the selected motion detection model.

3. The portable terminal of claim 1, further comprising an input unit configured to receive key input data configured to activate an operation of the motion detection.

4. The portable terminal of claim 1, further comprising a display unit configured to display state information.

5. The portable terminal of claim 4, wherein the display unit is at least one of: a color Liquid Crystal Display (LCD); an Active Mode Organic Light Emitting Diode (AMOLED); and a touch input device.

6. A method for providing motion detection in a portable terminal, the method comprising:
   storing a plurality of motion detection models comprising a standing still mode, a walking mode and a running mode, each motion detection model comprising respective different parameters to identify a motion of the terminal;
   gathering sensing information comprising first information for selecting a motion detection model and second information for identifying the motion of the terminal;
   selecting a motion detection model among the stored plurality of motion detection models based on the first information;

compensating the second information using a parameter of the selected motion detection model; and identifying a motion based on the processed second information, wherein the method further comprises:
performing motion detection by using the selected motion detection model, wherein the first information used to determine the motion detection model is received from a sensor comprising one or more of a gyro sensor and an acceleration sensor;

deactivating a motion detection function if an error occurs in the motion detection when the motion detection model of the portable terminal is determined; and controlling an operation of the portable terminal corresponding to the identified motion.

7. The method of claim 6, further comprising, deactivating the motion detection function if an error occurs in the motion detection based on the selected motion detection model.

8. The method of claim 6, further comprising receiving key input data configured to activate the motion detection function.

9. The method of claim 6, further comprising displaying state information.

10. A portable terminal comprising:
a sensor configured to generate sensing information comprising first information for identifying a motion detection model and second information for identifying a motion of the portable terminal;

a memory configured to store a plurality of motion detection models comprising a standing still mode, a walking mode and a running mode, each motion detection model comprising respective different parameters to identify the motion of the terminal; and a controller configured to:
determine one of the plurality of motion detection models of the portable terminal based on the first information;

deactivate the determined motion detection model with a parameter among the plurality of motion detection models if an error occurs in the determined motion detection model; and identify the motion of the terminal based on the second information, wherein the controller is further configured to perform motion detection by using the selected motion detection model, wherein the first information used to determine the motion detection model is received from a sensor comprising one or more of a gyro sensor and an acceleration sensor, wherein the controller is further configured to deactivate a motion detection function if an error occurs in motion detection when the motion detection model state of the portable terminal is determined by the controller, and wherein the controller is further configured to control an operation of the portable terminal corresponding to the identified motion.

11. The portable terminal of claim 10, wherein the plurality of motion detection models further comprise at least one of a non-moving mode, a fast-walking mode, or a fast-running mode.

12. The portable terminal of claim 10, further comprising an input unit configured to receive key input data configured to activate the motion detection function of the portable terminal.

13. The portable terminal of claim 10, further comprising a display unit configured to display state information.

14. The portable terminal of claim 13, wherein the display unit is at least one of: a color Liquid Crystal Display (LCD); an Active Mode Organic Light Emitting Diode (AMOLED); and a touch input device.

* * * * *